United States Patent
Daniels et al.

(10) Patent No.: US 8,428,552 B1
(45) Date of Patent: Apr. 23, 2013

(54) SYSTEM AND METHOD OF WIRELESS COMMUNICATION DEVICE PROVISIONING FOR PREPAID SERVICE

(75) Inventors: Tiffany N. Daniels, San Clemente, CA (US); Michael A. Gailloux, Overland Park, KS (US); Kenneth W. Samson, Belton, MO (US)

(73) Assignee: Sprint Communications Company L.P., Overland Oark, KS (US)

( * ) Notice: Subject to any disclaimer, the term of this patent is extended or adjusted under 35 U.S.C. 154(b) by 226 days.

(21) Appl. No.: 13/042,032

(22) Filed: Mar. 7, 2011

(51) Int. Cl.
*H04M 11/00* (2006.01)
(52) U.S. Cl.
USPC ........... 455/406; 455/405; 455/407; 455/408; 455/440; 455/445; 705/50; 705/51; 705/57; 705/58; 705/64
(58) Field of Classification Search .......... 455/405–408, 455/440, 422.1; 705/50–51, 57–59, 64–66
See application file for complete search history.

(56) References Cited

U.S. PATENT DOCUMENTS 7,885,661 B2 * 2/2011 Cai ................................ 455/445

* cited by examiner

*Primary Examiner* — Kiet Doan
*Assistant Examiner* — Michael T Vu

(57) ABSTRACT

A system is provided comprising processor, memory, and a provisioning application that receives a first message from a rating engine, the first message providing a first rating of a prepaid subscription account associated with a portable electronic device. The system also configures a first setting to a first index wherein the first setting is based on the first rating and wherein the first setting is associated with the device receiving access to services without further contact with the rating engine. The system also receives a second message from the rating engine, the second message providing a second rating of the account. The system also configures a second setting to the first index based on the second rating wherein the second setting replaces the first setting and the second setting is associated with contacting the rating engine before receiving access to services.

14 Claims, 6 Drawing Sheets

SYSTEM AND METHOD OF WIRELESS COMMUNICATION DEVICE PROVISIONING FOR PREPAID SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

There are two principal ways to pay for mobile telephone service: the prepaid or "pay-as-you-go" model where voice, text, and data communication services are paid for before use and added to a phone unit via an Internet account or in retail stores, or the postpaid contract model where bills are presented for payment after the service has been consumed. Users may purchase a basic prepaid or postpaid package and then add on services and functionality to create a subscription customized to the users' needs. With prepaid plans, purchased credit is used to pay for mobile phone services at the point the service is accessed or consumed. If there is no available credit then access to the requested service is denied by the service provider. Users may add to or "top up" their credit at any time using a variety of payment mechanisms. Credit purchased for a prepaid mobile phone may have a time limit, for example ninety days from the date the last credit was added. Postpaid contract users are billed after the fact according to their use of mobile services at the end of each billing period. The customer's contract typically specifies a limit or allowance of minutes, text messages etc., and the customer will be billed at a flat rate for any usage equal to or less than that allowance. Any usage above that limit incurs extra charges.

SUMMARY

In an embodiment, a system is provided. The system comprises a processor, a memory, and a provisioning application stored in the memory, that, when executed on the processor, receives a first message from a rating engine, the first message providing a first rating of a prepaid subscription account associated with a portable electronic device. The system also configures a first setting to a first index stored in a home location register (HLR) associated with the portable electronic device wherein the first setting is based on the first rating and wherein the first setting is associated with the portable electronic device receiving access to services without further contact with the rating engine. The system also receives a second message from the rating engine, the second message providing a second rating of the prepaid subscription account. The system also configures a second setting to the first index based on the second rating wherein the second setting replaces the first setting and the second setting is associated with contacting the rating engine before receiving access to services.

In an embodiment, a method is provided. The method comprises a computer receiving a first request to connect a first voice call to a first portable electronic device wherein the first portable electronic device is associated with a first prepaid subscription account. The method also comprises the computer determining that a first mobile terminating system index configured for the first prepaid subscription account indicates the first prepaid subscription account is a postpaid account. The method also comprises the computer connecting the first voice call.

In an embodiment, a method is provided. The method comprises a computer receiving a first message from a rating engine wherein the first message indicates that a first prepaid subscription account and a third prepaid subscription account are presently associated with a first account status and wherein the first message further indicates that a second prepaid subscription account and a fourth prepaid subscription account are presently associated with a second account status. The method also comprises the computer determining that mobile terminating system indices presently configured for each of the first prepaid subscription account, the second prepaid subscription account, the third prepaid subscription account, and the fourth prepaid subscription account indicate each of the first prepaid subscription account, the second prepaid subscription account, the third prepaid subscription account, and the fourth prepaid subscription account is postpaid. The method also comprises the computer reconfiguring a second mobile terminating system index associated with the second prepaid subscription account to indicate the second prepaid subscription account is a prepaid account. The method also comprises the computer reconfiguring a fourth mobile terminating system index associated with the fourth prepaid subscription account to indicate the fourth prepaid subscription account is a prepaid account. The method also comprises the computer receiving a second message from the rating engine wherein the second message indicates that the fourth prepaid subscription account is presently associated with the first account status. The method also comprises the computer reconfiguring the fourth mobile terminating system index associated with the fourth prepaid subscription account to indicate the fourth prepaid subscription account is a postpaid account.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
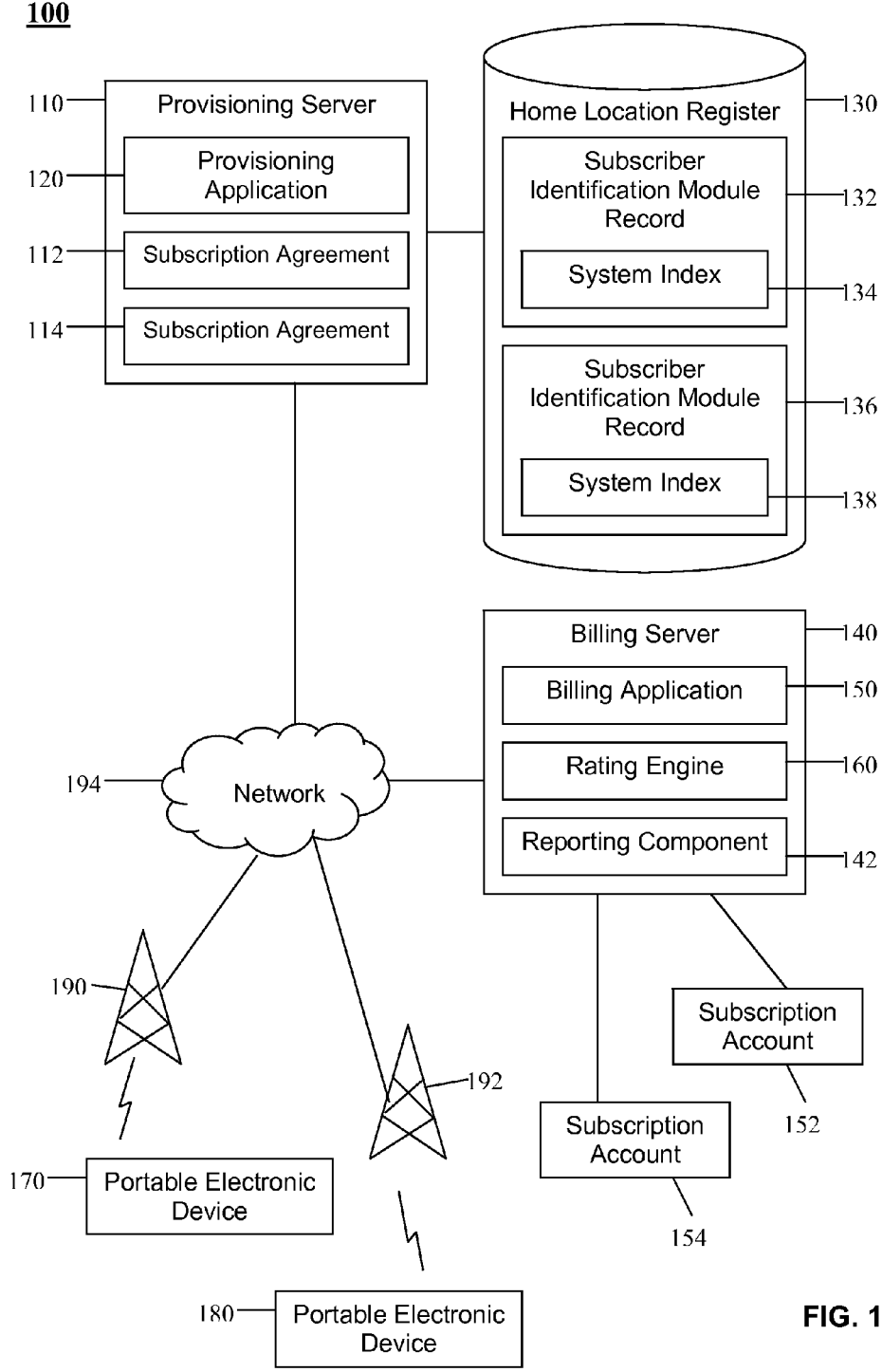
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure describes a system and methods that promote a telecommunications service provider to reduce system load associated with prepaid call processing by recoding some prepaid calls as postpaid calls, thereby circumventing costly rating actions usually applied to prepaid calls. By manipulating system index settings for prepaid subscriptions associated with acceptable payment records, calls and other service usage by such acceptably-performing prepaid subscriptions may bypass real time processing by a rating engine and be more rapidly connected. The bypassing of the rating engine may promote the provider to realize cost savings associated with reduced hardware and software investment for the rating engine and billing systems. The provider additionally realizes processing efficiencies arising from faster call connection.

The provider of wireless telecommunications services may not engage a rating engine on a real time basis for calls associated with postpaid subscriptions that receive invoices for services consumed when a billing period closes. The provider may, by contrast, contact the rating engine for most or all services associated with prepaid subscriptions that pay in advance of receiving access to services. When a call is to be processed involving a prepaid subscription, the rating engine examines the prepaid subscription to determine its payment status and other compliance to ascertain whether the call is to be connected. If payment status is not satisfactory, the rating engine may adversely rate the prepaid call such that it is not processed. Because engaging the rating engine may take place on a real time, per transaction basis for both incoming and outgoing transmissions associated with prepaid subscriptions, this places processing burden on the systems of the provider. Growth in prepaid subscription call activity may lead to increased processing hardware and software expense associated with the rating engine and billing systems.

The present disclosure teaches that under some operating conditions a majority of rating actions of prepaid calls, text, and other transmissions do in fact result in acceptable ratings and provision of service. These rating actions may be considered wasted effort when rating actions resulting in acceptable ratings and provision of service can be expected. Because subscription payment performance by prepaid wireless subscribers is historically acceptable in many cases, engaging a rating engine on a real time basis before providing wireless services to acceptably-performing prepaid subscriptions may not be necessary from a credit perspective and may unnecessarily consume processing resources. Because rationale for contacting a rating engine with prepaid subscriptions may be driven by credit-related concerns and because payment performance by prepaid subscriptions may be historically acceptable, the present disclosure teaches that the rating engine may be circumvented for selected calls involving prepaid subscriptions. This is accomplished by manipulating system indices in a home location register (HLR) to cause calls associated with prepaid subscriptions to appear as instead associated with postpaid subscriptions, whose calls do not receive real time rating engine engagement.

The rating engine, that in some embodiments may be associated with a billing system, periodically generates reports about payment activity of a plurality of subscriptions, including prepaid subscriptions. A reporting component provided herein accesses these reports and identifies prepaid subscriptions that may be designated as performing acceptably, paying as agreed, or provided some other rating. This triggers a provisioning event that manipulates system indices for these identified prepaid subscriptions to appear as postpaid subscriptions. When incoming or outgoing voice, text, and other transmissions associated with these modified subscriptions are processed, the rating engine is bypassed and the transmissions are connected without the need for real time engagement of the rating engine.

Should a prepaid subscription designated as performing and subjected to the modification described herein subsequently become delinquent or otherwise noncompliant, the reporting component is alerted to this event through its periodic access to subscription reports. The system index for the now-delinquent prepaid subscription may be altered back to its original setting such that wireless services associated with the prepaid subscription receive review by the rating engine before connection.

Turning now to FIG. 1, a system 100 is provided. The system 100 comprises a provisioning server 110, a provisioning application 120, a home location register (HLR) 130, a billing server 140, a reporting component 142, a billing application 150, a rating engine 160, portable electronic device 170, 180, a base transceiver station (BTS) 190,192, and a network 194.

The provisioning server 110 is a computer system. Computer systems are described in detail hereinafter. The provisioning application 120 executes on the provisioning server 110. The provisioning application 120 receives a plurality of messages from the reporting component 142 executing on the billing server 140 regarding payment and other performance of subscription accounts 152, 154. In FIG. 1, subscription accounts 152, 154 are depicted inside boxes linked to the billing server 140. It is understood that the subscription accounts 152, 154 may be data structures stored in a database accessible to the billing server 140 and possibly other computers, for example via the network 194. The subscription accounts 152, 154 may identify a subscription plan, identify subscribers, contain personal information about the subscribers, contain subscriber profile information such as demographics information and/or consumer history information, contain account historical information, or may contain pointers or references to access this kind of information. The subscription accounts 152, 154 are associated with portable electronic devices 170, 180, respectively. The portable electronic devices 170, 180 access one or more wireless communication services. Subscription accounts 152, 154 may be subject to prepaid, postpaid, or other payment arrangements under subscription agreements 112, 114. A telecommunications service provider makes the services available to the portable electronic devices 170, 180 under the subscription agreements 112, 114. The services include both transmitting as well as receiving voice, short message service (SMS), hereinafter text, and other messaging services. When performance of subscription accounts 152, 154 that are prepaid accounts is satisfactory, the provisioning application 120 manipulates settings of system indices 134, 138 associated with the portable electronic devices 170, 180. This action may allow the associated subscription accounts 152, 154, that are prepaid accounts, to be designated as postpaid accounts during voice and text message processing. Because connection of wireless transmissions associated with postpaid accounts may not involve real time engagement of the rating engine 160, this may alleviate the need for calls associated with such modified prepaid subscription accounts 152, 154 to be forwarded to the rating engine 160 before the calls are processed. This relieves the rating engine 160 of the task of performing real time rating of selected prepaid calls and reduces processing burden from the rating engine 160. This change may produce cost savings to the telecommunications service provider.

In the present disclosure, subscription accounts 152, 154 that are described as prepaid are those that for a designated period of time, for example a month, there is an unlimited or substantially unlimited amount of defined activity, for example minutes of voice conversation and text messaging, allowed to the subscriber. Real-time monitoring of a defined pool of voice minutes and/or text messages or prepaid funds is not required for rating or billing. Monitoring for average levels of usage determined to be extreme may be accomplished on a more delayed basis and may result in termination or suspension and or back billing or subtraction from funds previously paid in for a prepaid subscription account 152. The present disclosure teaches monitoring of subscription account activity and detection of activity levels that may be extreme or abnormal and that may result in conversion or re-indexing of prepaid subscription accounts 152, 154, that had been designated as postpaid accounts for rating purposes, back to their original prepaid status.

While it may be an established practice for voice calls, text messaging, and other service requests associated with prepaid subscription accounts 152, 154 to be sent to the rating engine 160 for rating and approval before the transmissions are connected, this step may be unnecessary with prepaid subscription accounts 152, 154 that have been established for a predetermined time period and have exhibited satisfactory performance. The practice of sending calls associated with prepaid subscription accounts 152, 154 to the rating engine 160 before allowing connection may traditionally be based on risk profiles and credit-related concerns about such subscribers. If an acceptable percentage of prepaid subscription accounts 152, 154 pay as agreed, contacting the rating engine 160 on a real time basis for approval of services associated with these prepaid subscription accounts 152, 154 may produce little value to the telecommunications service provider and be burdensome on the rating engine 160 and supporting systems. Based on acceptable performance, the provisioning application 120 adjusts system indices 134, 138 for prepaid subscription accounts 152, 154 to re-index them as postpaid subscription accounts 152, 154, permitting the bypassing of the rating engine 160 for real time processing and reducing burden on the rating engine 160 and other components.

The telecommunications service provider offers a plurality of subscription plans for wireless voice, data, and other communication services. Some subscription plans may be referred to as prepaid plans wherein the subscriber makes payment for services in advance, for example at the beginning of a thirty day period. Provided the subscriber pays an agreed amount by an agreed day of each month or other period, the subscriber receives access to the services for the covered time period. In some cases, the subscriber under a prepaid plan may receive access to unlimited voice and text services for the future period covered by the subscriber's payment. If the subscriber does not meet these terms, the telecommunications service provider may suspend the subscriber's access to the services. Subscription accounts 152, 154 that are prepaid are also referred to as "pay-as-you-go" plans. While some subscription accounts that are prepaid are also referred to as "no contract" plans because subscribers do not commit to a fixed future duration of months or years for service, the telecommunications service provider still mandates various terms for services. The subscriber implicitly agrees with these terms by remitting payment and using the services. While the subscriber may not have executed a traditional contract, subscribers under prepaid subscription accounts 152, 154 are subject to the terms of subscription agreements 112, 114 maintained by the telecommunications service provider.

In contrast with prepaid plans, the telecommunications service provider may also offer its customers subscription plans wherein subscribers make payment after services have been consumed. These types of subscription agreements 112, 114 may be referred to as postpaid. After the close of a billing period, for example a thirty day period, the telecommunications service provider sends an invoice to the subscriber requesting payment for services consumed during the preceding thirty day period. The invoice may detail services usage during the billing period, for example voice calls made or voice minutes used and text messages sent and/or received. As with prepaid plans, the telecommunications service provider may suspend services if the subscriber does not comply with the terms of the subscription agreement 112, including making timely payment.

The telecommunications service provider may maintain the billing server 140 that hosts the billing application 150. The billing application 150 may generate electronic notices to portable electronic devices 170, 180 used under prepaid subscription accounts 152, 154. The electronic notices remind prepaid subscribers to make payment by a specified date or risk suspension or cancellation of service. The billing application 150 also sends invoices to customers using portable electronic devices 170, 180 under postpaid subscription accounts 152, 154 advising the customers of services usage during a preceding period, amount due, and due date. Invoices may be sent electronically, in hard copy, or by another means. In an embodiment, the telecommunications service provider may not own or operate the billing server 140 and the billing application 150 and may instead outsource billing and other activities to third parties.

The system also comprises the rating engine 160 that is associated with the billing application 150. When some service requests are received for processing, for example incoming voice calls directed to the portable electronic device 170 or outgoing voice calls placed by the portable electronic device 170, the telecommunications service provider may first engage the rating engine 160 before fulfilling the request. The rating engine 160 is a software application that examines aspects of a voice, text, or other transmission and determines a cost of the transmission. The rating engine 160 examines time properties of the proposed transmission, for example day of week, date, time of day, and the amount of usage, for example duration of call and amount of data transmitted. The rating engine 160 also examines the source and destination of the call, i.e., domestic or international, and premium charges that may apply, for example if a plurality of parties are involved in the call or if third party charges apply for premium content that is to be delivered during or otherwise in association with the call. The rating engine 160 may receive a call detail record (CDR) for each call and analyze the call using information in the call detail record as well as pricing information that applies to the call.

The rating engine 160 additionally examines information about the subscription account 152 associated with the call. The subscription account 152 and the portable electronic device 170 are identified in the call detail record. The rating engine 160 determines whether the subscription account 152 is associated with a subscription agreement 112 that is a postpaid, prepaid, or other subscription agreement 112. The rating engine 160 may analyze the subscription account 152 for its performance in meeting the terms of its subscription agreement 112. The rating engine 160 may include ratings or grading of the performance of the subscription account 152 along with the other information about the call that it passes to the billing application 150. In the event the rating engine 160, after analysis of the performance of the subscription account 152, determines that the subscription account 152 is in default or performance is otherwise unacceptable, the rating engine 160 may recommend that the call not be connected. This may be the case with calls that the portable electronic device 170 is receiving, referred to as mobile-terminated calls. This may also be the case with calls that the portable electronic device 170 is placing, referred to as mobile-originated calls.

In an embodiment, the rating engine 160 and the billing application 150 may be commercially available software packages. The telecommunications service provider may purchase the rating engine 160 and the billing application 150 from providers of such software products. The rating engine 160 and the billing application 150 may be developed and sold by the same software provider because the rating engine 160 and the billing application 150 work closely in developing cost information for individual calls as well as generating the billing for the calls upon their connection and completion. While the rating engine 160 and the billing application 150 are depicted in FIG. 1 as executing on the billing server 140, in an embodiment the rating engine 160 and the billing application 150 execute on separate computers. In the course of its activities, the rating engine 160 may regularly generate reports that include information about the performance of a plurality of subscription accounts 152, 154 under their subscription agreements 112, 114, including compliance with payment provisions. This reporting may include the application of rating codes to subscription accounts 152, 154 to describe the payment performance of the plurality of subscription accounts 152, 154. These reports may be used by the management of the telecommunications service provider in pricing products, implementing policy regarding actions with respect to subscription accounts 152, 154 with various problems or other conditions, and developing products and marketing strategy.

The telecommunications service provider may use policies to determine when to engage the rating engine 160 on various incoming and outgoing transmissions, including voice, text, and other services. The policies may vary depending on whether the subscription account 152 associated with the transmission is a postpaid or prepaid subscription account 152. When transmissions are associated with postpaid subscription accounts 152, 154, the telecommunications service provider may not engage the rating engine 160 at the time that calls are placed and received by subscribers under those postpaid subscription accounts 152, 154. Because postpaid subscription accounts 152, 154 are not billed until after the close of a billing period, the telecommunications service provider may deem it unnecessary to engage the rating engine 160 for pricing and other information at the time a call is placed or received by the portable electronic device 170. Whether calls associated with postpaid subscription accounts 152, 154 pass through the telecommunications service provider on a mobile-terminated, mobile-originated, or other basis, the rating engine 160 may be bypassed at the time of the call, engaged later, or not at all. Call detail records of calls are created and stored for postpaid calls, but the resources of the rating engine 160 may not be engaged at the time of the call. The call detail record of the call may be examined later for costing, for example when the billing period closes and the billing application 150 is generating a monthly or other invoice for the postpaid subscription account 152.

The telecommunications service provider may as a policy engage the rating engine 160 for incoming and outgoing calls associated with prepaid subscription accounts 152, 154. When such a prepaid call is being processed, the telecommunications service provider may wish to determine that the prepaid subscription account 152 has been performing as agreed under its subscription agreement 112. The telecommunications service provider may wish its prepaid subscription accounts 152, 154 to establish track records in terms of making payments on time and meeting any other obligations over a period of months or other service periods. The telecommunications service provider may not wish to connect calls associated with prepaid subscription accounts 152, 154 without determining first that the subscription accounts 152, 154 are in good standing and otherwise comply with rules that may be applied by the rating engine 160.

The telecommunications service provider may have determined that prepaid subscribers and postpaid subscribers historically have different credit risk profiles. The telecommunications service provider may perform more extensive credit checking before allowing a prospective customer to open a postpaid subscription account 152 and may therefore determine that engaging the rating engine 160 is not necessary for postpaid subscription accounts 152, 154 at the time of the call. With prepaid subscription accounts 152, 154, because payment is received before services are granted and services provided may be more limited, the telecommunications service provider may perform less overall customer credit and other checking when opening prepaid subscription accounts 152, 154. The telecommunications service provider may, however, mitigate risks associated with performing less credit checking at the outset by engaging the rating engine 160 on a real time basis with each call associated with prepaid subscription accounts 152, 154. The telecommunications service provider may engage the rating engine 160 on a real time basis for these calls even when the prepaid subscription accounts 152, 154 have established track records of acceptable account performance. This may be unnecessarily costly and burdensome on the rating engine 160 and other systems.

The present disclosure teaches that engaging the rating engine 160 is not necessary for all calls and other transmissions associated with prepaid subscription accounts 152, 154. One of the primary purposes of engaging the rating engine 160 in the case of prepaid subscription accounts 152, 154 is to block transmissions involving prepaid subscription accounts 152, 154 not performing satisfactorily. Because a majority or acceptable percentage of prepaid subscription accounts 152, 154 may historically perform as agreed, the engaging of the rating engine 160 for these prepaid subscription accounts 152, 154 consumes resources unnecessarily. The present disclosure provides a system and methods for segregating prepaid subscription accounts 152, 154 that are performing satisfactorily from prepaid subscription accounts 152, 154 that are not performing satisfactorily. The system promotes calls associated with acceptably performing prepaid subscription accounts 152, 154 to bypass the rating engine 160 and receive processing. Calls associated with unacceptably performing prepaid subscription accounts 152, 154 remain identified as prepaid and are sent to the rating engine 160 for deliberation and handling as they traditionally have been. By removing the burden from the rating engine 160 of analyzing calls associated with prepaid subscription accounts 152, 154 that are performing acceptably, the telecommunications service provider may realize savings in information technology expense.

The provisioning application 120 promotes the bypassing of the rating engine 160 by acceptably performing prepaid subscription accounts 152, 154 by manipulating system indices 134, 138 associated with subscriber identification module records 132, 136 stored in the home location register (HLR) 130. Whereas the system indices 134, 138 for subscriber identification module records 132, 136 associated with prepaid subscription accounts 152, 154, respectively, are usually configured to indicate that the prepaid subscription accounts 152, 154 are prepaid accounts, the provisioning application 120 changes the system indexes 134, 138 to code them as postpaid accounts. This promotes the previously described bypassing of the rating engine 160 based on implementation of policies taught herein adopted by the telecommunications service provider that calls associated with acceptably performing prepaid subscription accounts 152, 154 may bypass real time engagement with the rating engine 160.

The system 100 comprises the reporting component 142 that executes on the billing server 140 and accesses information generated by the rating engine 160. In the regular course of its operations, the rating engine 160 may generate data about the transactions it rates and forwards for fulfillment, rejection, or other processing. The rating engine 160 may accumulate data about payment performance by various customers of the telecommunications service provider. In addition to directly generating the payment performance data as a result of its processing activities, the rating engine 160 may also receive payment performance data from the billing application 150. The reporting component 142 comprises at least one application programming interface (API) that accesses payment performance data from the rating engine 160. The reporting component 142 may analyze codes or designations provided within the payment performance data to extract information identifying prepaid subscription accounts 152, 154 determined to be performing satisfactorily. In an embodiment, the rating engine 160 is not aware of the actions of the reporting component 142. The data needed by the reporting component 142 to assist in performing the actions taught herein may have already been generated anyway for other unrelated purposes. Little or no action by the rating engine 160 may be involved in the reporting component 142 capturing the needed data. In an embodiment, the rating engine 160 may store a plurality of subscription account performance data into a file that the reporting component 142 accesses and extracts what it needs. The rating engine 160 may be unaware of this action by the reporting component 142. The actions of the reporting component 142 may place no processing burden on the rating engine 160.

Once the reporting component 142 gathers information about prepaid subscription accounts 152, 154 that are performing satisfactorily, it may store the information and perform other processing. This may comprise identifying the portable electronic devices 170, 180 associated with the satisfactorily-performing prepaid subscription accounts 152, 154. The reporting component 142 or another component may access a database (not shown) that links subscription accounts 152, 154 with portable electronic devices 170, 180. Each subscription account 152, 154 may be associated with at least one international mobile subscriber identity (IMSI), a unique identification provided to each portable electronic device 170, 180. The provisioning application 120 may store a file identifying an international mobile subscriber identity for each portable electronic device 170 associated with a prepaid subscription account 152 determined to be performing satisfactorily.

The provisioning application 120 then accesses the home location register (HLR) 130 that stores subscriber identification module records 132, 136 associated with the portable electronic devices 170, 180. The subscriber identification module records 132, 136 contain information about subscriber identification modules (SIM) installed in the portable electronic devices 170, 180. The subscriber identification modules are identifiable by their international mobile subscriber identity numbers.

Each subscriber identification module record 132, 136 in the home location register 130 may contain or be associated with a plurality of system indices 134, 138 that describe various aspects of the portable electronic devices 170, 180, respectively, with which they are associated. Although FIG. 1 depicts the subscriber identification module record 132 containing only one system index 134 and the subscriber identification module record 136 containing only one system index 138, in an embodiment subscriber identification module records 132, 136 may contain a plurality of system indices 134, 138. While the system indices 134, 138 are depicted in FIG. 1 as inside the subscriber identification module records 132, 136, respectively, suggesting that they are contained within them, this depiction is provided for discussion purposes. Subscriber identification module records 132, 136 and their system indices 134, 138 may in fact be linked or associated by pointers or other software mechanisms within the home location register 130 or elsewhere.

The system indices 134, 138 comprise data fields wherein information about portable electronic devices 170, 180 is entered to describe some aspect of the portable electronic devices 170, 180 or their service. System indices 134, 138 may be configured using the signaling system number 7 (SS7) set of telephony signaling protocols. The system index 134 for the subscriber identification module record 132 installed in the portable electronic device 170 may, for example, be a mobile-terminated (MT) system index, a mobile-originated (MO) system index, or other index. The system index 134 may contain at least one value depending on the purpose of the system index 134. In an embodiment, the system index 134 may be null and contain no value. A mobile-terminated system index may be configured to re-index the portable electronic device 170 as associated with a prepaid subscription account 152, a postpaid subscription account 154, or in another manner.

When a satisfactorily-performing prepaid subscription account 152 is to be re-indexed as postpaid to bypass the rating engine 160 as described herein, the provisioning application 120 manipulates the system index 134 to describe the subscription account 152 as postpaid instead of prepaid. The system index 134 may be associated with mobile-terminated call activity for calls received by the portable electronic device 170, 180. The system index 134 may be associated with mobile-originated call activity for calls placed by the portable electronic device 170. As noted, the subscriber identification module record 132 for the portable electronic device 170 may be associated with a plurality of system indices 134, 138. The provisioning application 120 may manipulate the plurality of the system indices 134, 138 as necessary to cause the prepaid subscription account 152 to be read as a postpaid account during call processing, permitting transmissions associated with the prepaid subscription account 152 to bypass the rating engine 160.

The telecommunications service provider generates new call detail records or reads existing call detail records for voice calls, text messages, and other transmissions it is carrying that involve subscription accounts 152, 154. It processes call detail records for incoming and outgoing transmissions directed to and sent by the portable electronic devices 170, 180. When call detail records are created, the home location register 130 may be accessed to read locate subscriber identification module records 132, 136 for the portable electronic devices 170, 180. The call detail records may contain the system indices 134, 138 for the portable electronic devices 170, 180 or may contain links, pointers, network paths, or other references to the system indices 134, 138. As incoming or outgoing calls are handled and call detail records are processed, system indices 134, 138 contained within, referenced by, or otherwise associated with the call detail records are read. If the system indices 134, 138 indicate that the subscription account 152 associated with the call is a postpaid account, the rating engine 160 is not contacted in real time. This is the case whether the subscription account 152 is truly a postpaid account or whether the subscription account 152 is a prepaid subscription account 152 whose system indices 134, 138 have been modified to cause it to appear as a postpaid account and bypass the rating engine 160.

The telecommunications service provider contacts the billing application 150 executing on the billing server 140 during the processing of mobile-terminated, mobile-originated, and other transmissions involving portable electronic devices 170, 180 associated with subscription accounts 152, 154. The billing application 150 analyzes call detail records associated with the calls. The billing application 150 examines the subscribing portable electronic device 170 involved in the call, identified by its international mobile subscriber identity, examines system indices 134, 138 and their settings, and determines if the transmission is mobile-terminated or mobile-originated i.e., whether the portable electronic device 170 is receiving or originating the transmission, respectively.

If the transmission is mobile-terminated and the call detail record contains a subscription account 152 and a system index 134 indicating the subscription account 152 of the recipient portable electronic device 170 is postpaid, the billing application 150 causes the call to be processed without engaging the rating engine 160. The billing application 150 may be unaware of whether the subscription account 152 is a postpaid account or a satisfactorily-performing prepaid subscription account 152 whose system index 134 has been manipulated to make it appear as a postpaid account. This may be transparent to the billing application 150.

When the call or text message is mobile-originated wherein the portable electronic device 170 is placing the call or sending the message, the billing application 150 performs similar steps to determine whether or not to engage the rating engine 160. This includes examining system indices 134, 138 contained in the call detail record that indicate whether the subscription account 152 associated with the sending portable electronic device 170 is postpaid or prepaid. As with mobile-terminated calls, the billing application 150 may be unaware of whether the subscription account 152 is a postpaid account or a satisfactorily-performing prepaid subscription account 152 whose system index 134 has been manipulated to make it appear as a postpaid account.

With mobile-originated calls, an additional step may be performed. While mobile-terminated calls of most or all types received by the portable electronic device 170 associated with postpaid subscription accounts 152, 154 and prepaid subscription accounts 152, 154 manipulated as described herein may be processed without engaging the rating engine 160, some mobile-originated calls, for example international calls, may in most or all cases require engagement of the rating engine 160. The present disclosure teaches that the billing application 150 may read the telephone number dialed by the originating portable electronic device 170. If the dialed telephone number exceeds ten digits in length or exhibits other predefined characteristics, the billing application 150 may determine that the call is to an international destination. This exceptional situation may cause the billing application 150 to engage the rating engine 160 regardless of the settings of system indices 134, 138 in the call detail record. The rating engine 160 analyzes and rates the international call and passes information to the billing application 150 to bill the international call, which may not be included in unlimited calling that is a feature of some subscription agreements 112, 114.

The rating engine 160 and the billing application 150 may periodically produce a plurality of different reports that describe the payment performance and other contractual compliance of subscription accounts 152, 154. The reporting component 142 accesses information from these reports and feeds the information to the provisioning application 120 that manipulates system indices 134, 138 as described herein. This process may take place on a continuing basis. The payment performance and other compliance of some subscription accounts 152, 154 may change from one reporting cycle to another. Policies of the telecommunications service provider about what constitutes different levels of payment performance may also change. In an embodiment, a prepaid subscription account 152 whose payment performance was previously determined to be satisfactory and whose system indices 134, 138 were manipulated by the provisioning application 120 to allow bypassing of the rating engine 160 may begin to perform less-satisfactorily, poorly, or even default. The provisioning application 120 may then reclassify the prepaid subscription account 152 in its associated system indices 134, 138 as no longer postpaid and instead prepaid again. This results in calls associated with the prepaid subscription account 152 to be subjected to review by the rating engine 160 before connection. This may persist until the prepaid subscription account 152 cures its default or otherwise improves its performance and maintains acceptable performance for a predetermined period of time. In an embodiment, the prepaid subscription account 152 that is classified as postpaid but then begins to perform unacceptably and is reclassified in its associated system indices 134, 138 as prepaid may not be given another chance and its calls may thenceforth receive review by the rating engine 160. In an embodiment, a prepaid subscription account 152 may not have a negative track record of payment but may still not be a candidate for classification as postpaid because the prepaid subscription account 152 is a new account or is associated with a subscriber that has little established credit or verifiable income. Such a prepaid subscription account 152 may become eligible for classification as postpaid once it establishes an acceptable payment record.

The regular review of reports by the reporting component 142 and the functionality of the provisioning application 120 to accordingly manipulate system indices 134, 138 provide the flexibility to classify, declassify, and reclassify prepaid subscription accounts 152, 154 as postpaid accounts depending on changing payment and performance records of the prepaid subscription accounts 152, 154. This may promote efficient management of processing burden on the rating engine 160, the billing application 150, and other systems.

In an embodiment, payment performance or other account compliance by prepaid subscription accounts 152, 154 are not used as criteria for determining when to allow prepaid subscription accounts 152, 154. Other behaviors or characteristics of the prepaid subscription accounts 152, 154 unrelated to account performance may instead be used.

In an embodiment, the system index 134, 138 may be referred to as a resellerID or as a resellerid. The resellerID or resellerid may be developed as a customized system index 134 to indicate a prepaid subscription account 152 that is to be treated as a postpaid account. The resellerID or resellerid re-indexed as the customized system index 134 is placed in the home location register 130 and can be removed if necessary as discussed above. The provisioning application 120 taught herein may be configured to create the customized system index 134 upon receipt of information from the reporting component 142 and store it in the home location register 130. The customized system index 134 indicating a prepaid subscription account 152 that is to be treated as a postpaid account may be coded such that when a call detail record is created for a call associated with the prepaid subscription account 152, the customized system index 134 is read and its contents incorporated into the call detail record or otherwise communicated to the billing application 150.

The base transceiver stations 190, 192 may be any of a cellular wireless base transceiver station, for example a Code Division Multiple Access (CDMA), Global System for Mobile Communications (GSM), Universal Mobile Communications System (UMTS), and/or Long-term Evolution (LTE) cellular wireless base transceiver station; a World-wide Interoperable Microwave Access (WiMAX) base transceiver station; a WiFi access point; a femtocell; or other wireless access devices.

The network 194 promotes communication between the components of the system 100. The network 194 may be any communication network including a public data network (PDN), a public switched telephone network (PSTN), a private network, and/or a combination thereof.

It will be appreciated by one skilled in the art that the invention, while described above in the context of a call associated with a pre-paid subscriber account being treated, in some respects related to being granted access to the network 194, without being first validated by the rating engine 160, the teachings herein may be applied to other communication scenarios. For example, it is consistent with the present disclosure for a portable electronic device 170, 180 associated with a first type of account, a first type of rating and/or billing process, and a first type of network access approval process to be treated, in at least some respects, as a device would be treated that is associated with a second type of account, a second type of rating and/or billing process, and/or a second type of network access approval process. This alternative treatment may be triggered or induced by re-tagging and/or re-indexing the portable electronic device 170, 180 and/or the first type of account associated with the portable electronic device 170, 180.

Figure 2:
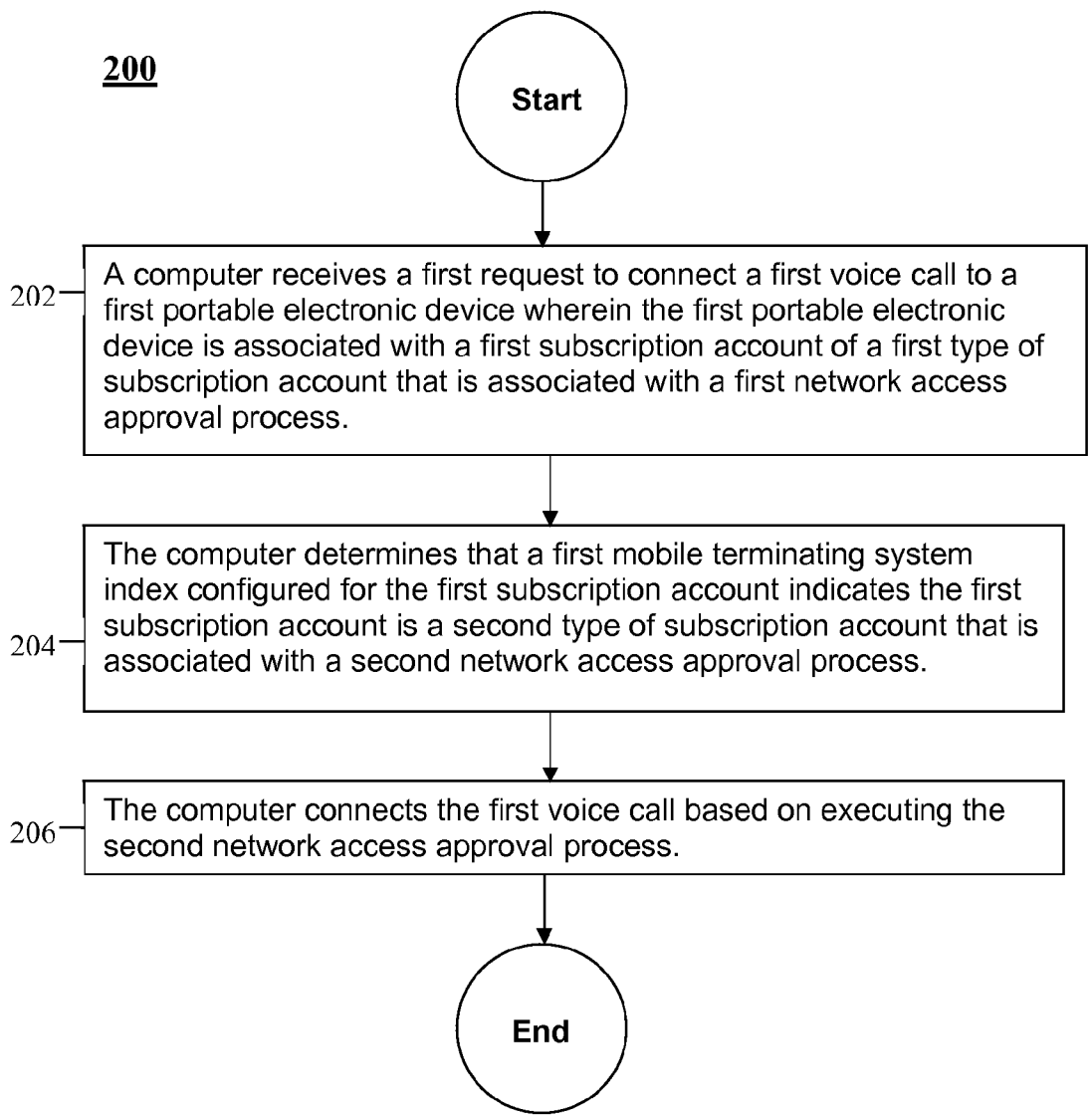
FIG. 2 is a flow chart illustrating a method according to an embodiment of the disclosure.

Turning now to FIG. 2, a method 200 is provided. At block 202, a computer receives a first request to connect a first voice call to a first portable electronic device wherein the first portable electronic device is associated with a first subscription account of a first type of subscription account that is associated with a first network access approval process. Alternatively, the computer may receive a request to connect the first portable electronic device to a communication network for communication services other than voice communication. At block 204, the computer determines that a first mobile terminating system index configured for the first subscription account indicates the first subscription account is a second type of subscription account that is associated with a second network access approval process. At block 206, the computer connects the first voice call based on executing the second network access approval process. Previous to the processing of block 204, the computer may have received a first rating from a rating engine and, in response to receiving the first rating, configured the first mobile terminating system index to indicate the first subscription account is the second type of subscription account. In some contexts, this may be referred to as re-indexing and/or retagging the first subscription account. In an embodiment, the first mobile terminating system index may be configured by default to indicate the first subscription account is a first type of subscription account associated with a first network access approval process.

Figure 3:
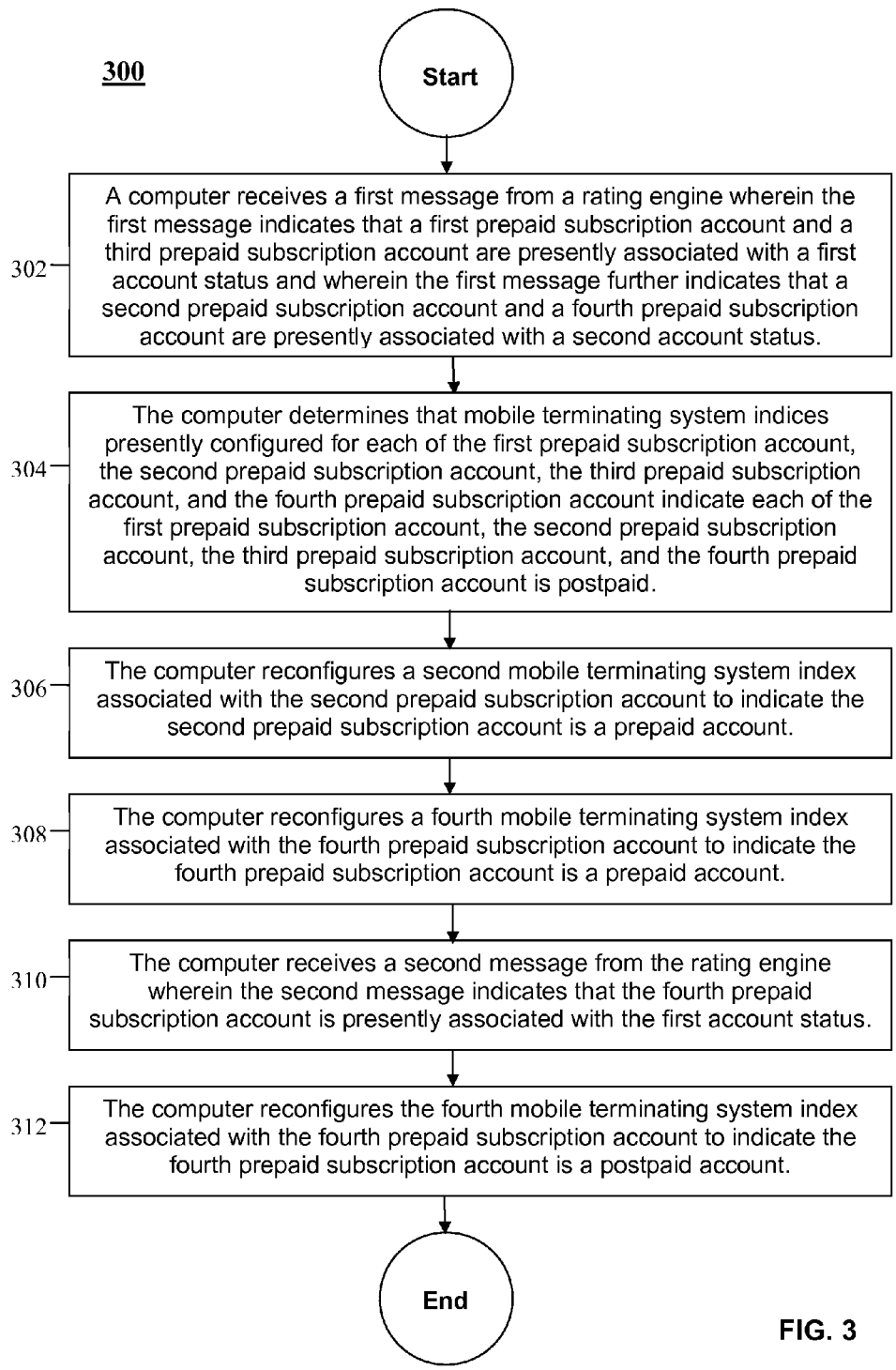
FIG. 3 is a flow chart illustrating a method according to an embodiment of the disclosure.

Turning now to FIG. 3, a method 300 is provided. Beginning at block 302, a computer receives a first message from a rating engine wherein the first message indicates that a first prepaid subscription account and a third prepaid subscription account are presently associated with a first account status and wherein the first message further indicates that a second prepaid subscription account and a fourth prepaid subscription account are presently associated with a second account status.

At block 304, the computer determines that mobile terminating system indices presently configured for each of the first prepaid subscription account, the second prepaid subscription account, the third prepaid subscription account, and the fourth prepaid subscription account indicate each of the first prepaid subscription account, the second prepaid subscription account, the third prepaid subscription account, and the fourth prepaid subscription account is postpaid. At block 306, the computer reconfigures a second mobile terminating system index associated with the second prepaid subscription account to indicate the second prepaid subscription account is a prepaid account.

At block 308, the computer reconfigures a fourth mobile terminating system index associated with the fourth prepaid subscription account to indicate the fourth prepaid subscription account is a prepaid account. At block 310, the computer receives a second message from the rating engine wherein the second message indicates that the fourth prepaid subscription account is presently associated with the first account status. At block 312, the computer reconfigures the fourth mobile terminating system index associated with the fourth prepaid subscription account to indicate the fourth prepaid subscription account is a postpaid account.

Figure 4:
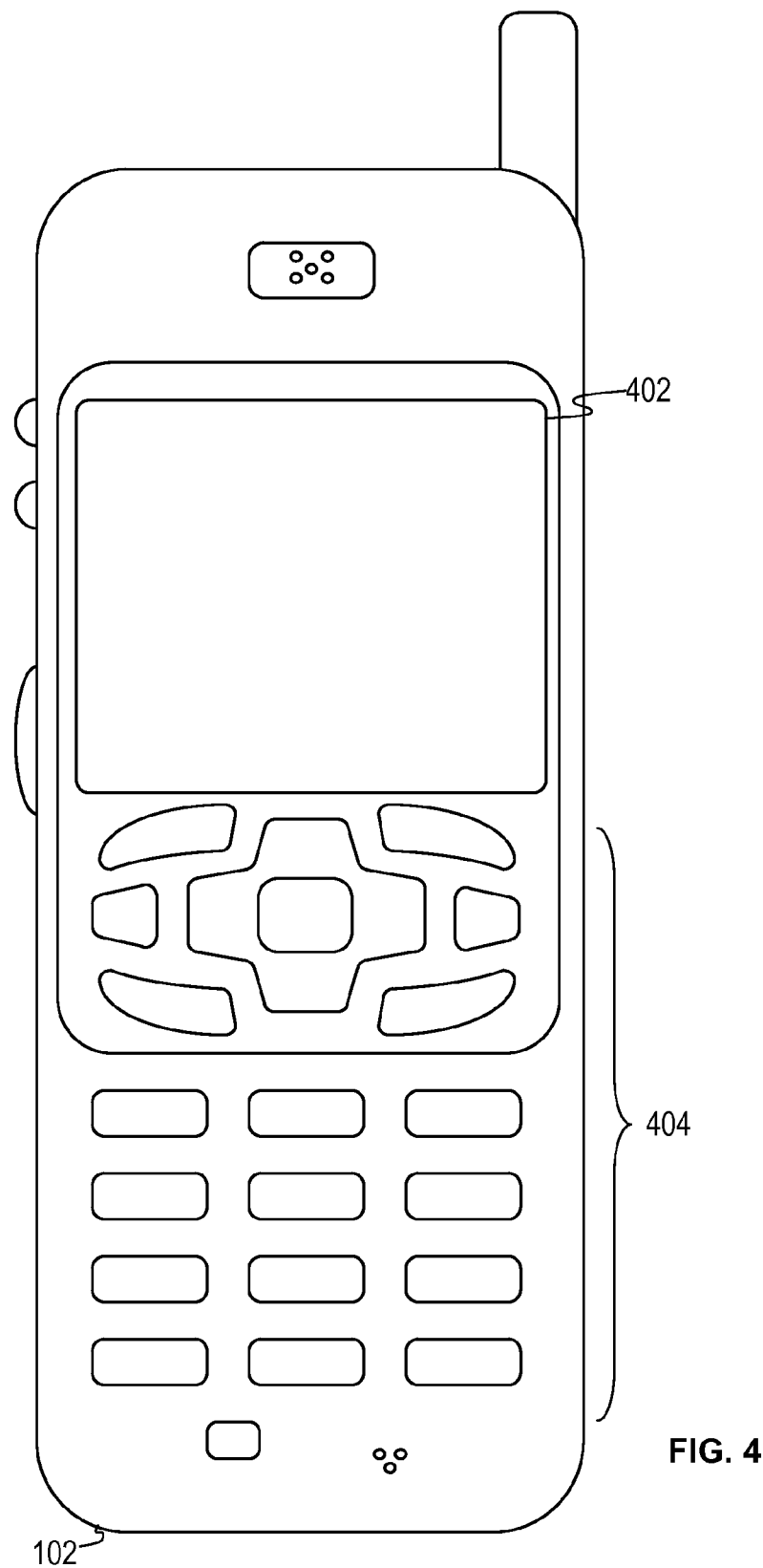
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. The mobile device 102 may in some embodiments exemplify the portable electronic devices 170, 180 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with base transceiver stations (BTS) 190, 192, a wireless network access node, a peer mobile device 102 or any other wireless communication network or system. While a plurality of base transceiver stations (BTS) 190, 192 are illustrated in FIG. 1, it is understood that the wireless communication system may comprise a single base transceiver station (BTS) 190. In some instances, the mobile device 102 may be in communication with multiple base transceiver stations (BTS) 190, 192 at the same time. The base transceiver stations (BTS) 190, 192 (or wireless network access node) are coupled to a wired network 194, such as the Internet. Via the wireless link and the wired network, the mobile device 102 has access to information on various servers that may provide content that may be shown on the display 402. Alternately, the mobile device 102 may access the base transceiver stations (BTS) 190, 192 through a peer mobile device 102 acting as an intermediary, in a relay type or hop type of connection.

Figure 5:
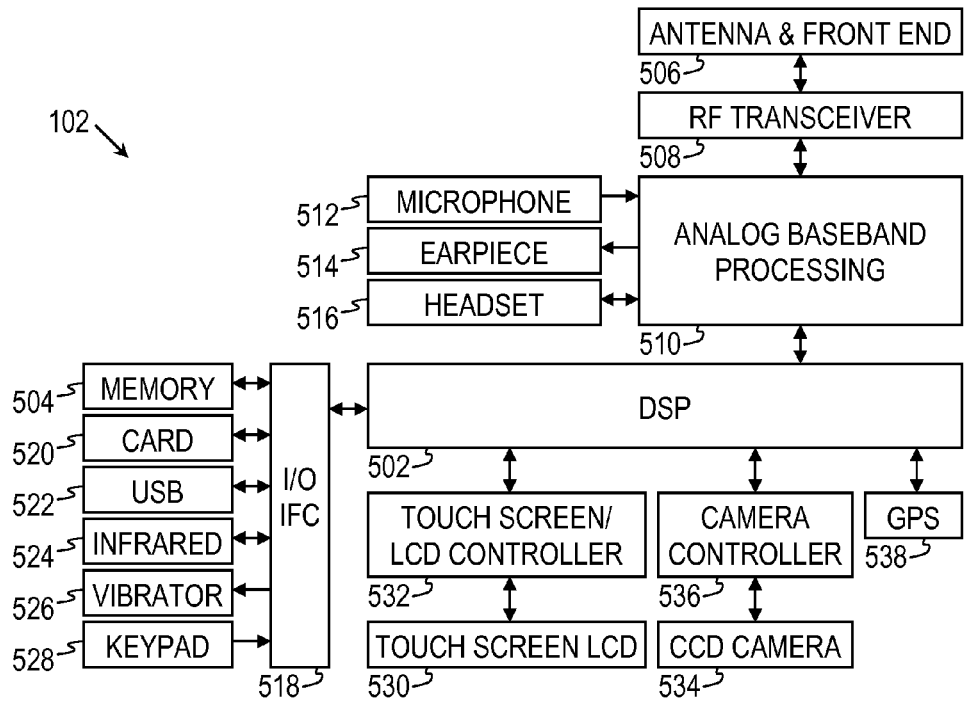
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
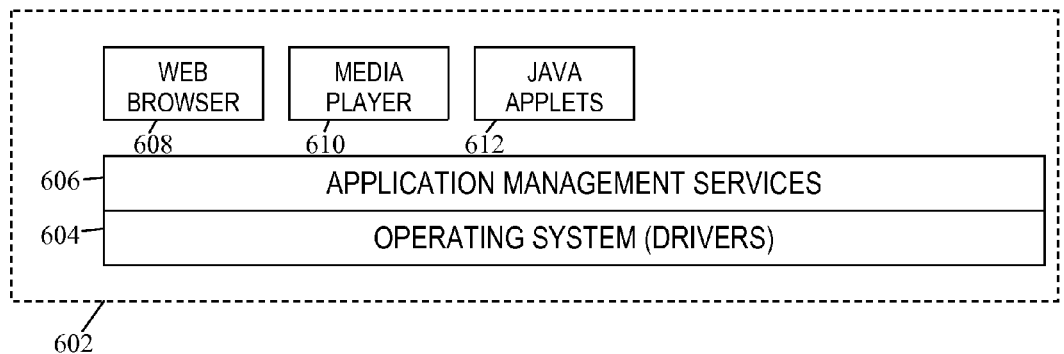
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
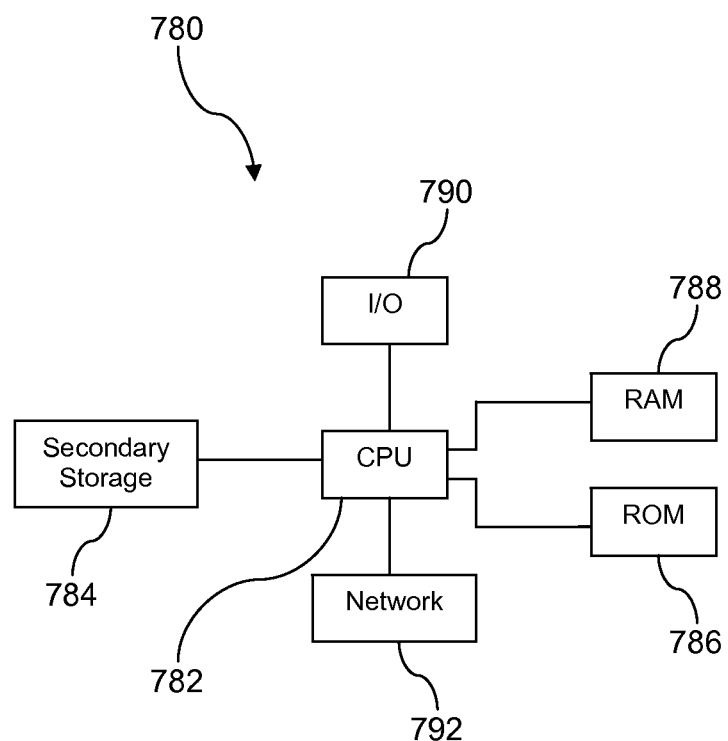
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, a baseband signal and/or a signal embodied in a carrier wave may be referred to as a transitory signal. In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for provisioning a portable electronic device for prepaid service, the system comprising:
 a processor;
 a memory; and
 a provisioning application stored in the memory, that, when executed on the processor:
  receives a first message from a rating engine, the first message providing a first rating of a prepaid subscription account associated with a portable electronic device,
  configures a first setting to a first index stored in a home location register (HLR) associated with the portable electronic device, wherein the first setting is based on the first rating, wherein the first setting is associated with the portable electronic device receiving access to services without further contact with the rating engine, wherein the first index is a system index associated with one of mobile-terminated transmissions received by the portable electronic device and mobile-originated transmissions placed by the portable electronic device, and wherein the first index is configured using the signaling system number 7 (SS7) suite of telephony signaling protocols,
  receives a second message from the rating engine, the second message providing a second rating of the prepaid subscription account, and
  configures a second setting to the first index based on the second rating, wherein the second setting replaces the first setting and the second setting is associated with contacting the rating engine before receiving access to services.

2. The system of claim 1, wherein the first rating and the second rating are produced in association with the rating engine performing periodic reviews of payment performance under the prepaid subscription account.

3. The system of claim 1, wherein the first rating is associated with the prepaid subscription account performing as agreed under a prepaid subscription agreement.

4. The system of claim 1, wherein the second rating is associated with the prepaid subscription account not performing as agreed under the prepaid subscription agreement.

5. The system of claim 1, wherein subscription agreements for prepaid subscription accounts specify payment in advance of receiving access to services.

6. The system of claim 1, wherein the rating engine is associated with a billing system for services provided under a plurality of prepaid subscription agreements and postpaid subscription agreements.

7. A method for connecting voice calls based on a type of subscription account, the method comprising:
 a computer receiving a first request to connect a first voice call to a first portable electronic device, wherein the first portable electronic device is associated with a first subscription account of a first type of subscription account that is associated with a first network access approval process, wherein the first type of subscription account is a prepaid type of subscription account;
 the computer determining that a first mobile terminating system index configured for the first subscription account indicates the first subscription account is a second type of subscription account that is associated with a second network access approval process, wherein the second type of subscription account is a postpaid type of subscription account;
 the computer connecting the first voice call based on executing the second network access approval process;
 receiving a second request to connect a second voice call to a second portable electronic device, wherein the second portable electronic device is associated with a second subscription account of the first type of subscription account;
 determining that a second mobile terminating system index configured for the second subscription account indicates the second subscription account is of the prepaid type of subscription account; and
 forwarding the second voice call to a rating engine, wherein the second mobile terminating system index indicates the second subscription account is a prepaid account based on a second rating received from the rating engine, wherein the second rating is associated with the rating engine determining that the second subscription account is not performing as agreed with terms of the first subscription agreement.

8. The method of claim 7, further comprising:
 receiving a first rating from a rating engine; and
 in response to receiving the first rating, configuring the first mobile terminating system index to indicate the first subscription account is the second type of subscription account.

9. The method of claim 8, wherein the first rating is associated with the rating engine determining that the first subscription account is being paid in conformance with terms of a first subscription agreement.

10. The method of claim 7, wherein the second voice call is forwarded to the rating engine to at least one of cause analysis of the performance of the second prepaid subscription account and initiate remedial action to bring the second prepaid subscription account to within terms of the second prepaid subscription agreement.

11. A method for reconfiguring mobile terminating system indices to indicate prepaid subscription account types using a rating engine, the method comprising:
 a computer receiving a first message from a rating engine, wherein the first message indicates that a first prepaid subscription account and a third prepaid subscription account are presently associated with a first account status, wherein the first message further indicates that a second prepaid subscription account and a fourth prepaid subscription account are presently associated with a second account status, wherein account status is determined by the rating engine performing periodic analysis of payment activity under prepaid subscription agreements, and wherein the rating engine is a component of a billing system associated with a telecommunications service provider;
 the computer determining that mobile terminating system indices presently configured for each of the first prepaid subscription account, the second prepaid subscription account, the third prepaid subscription account, and the fourth prepaid subscription account indicate each of the first prepaid subscription account, the second prepaid subscription account, the third prepaid subscription account, and the fourth prepaid subscription account is postpaid;

the computer reconfiguring a second mobile terminating system index associated with the second prepaid subscription account to indicate the second prepaid subscription account is a prepaid account;

the computer reconfiguring a fourth mobile terminating system index associated with the fourth prepaid subscription account to indicate the fourth prepaid subscription account is a prepaid account;

the computer receiving a second message from the rating engine, wherein the second message indicates that the fourth prepaid subscription account is presently associated with the first account status; and the computer reconfiguring the fourth mobile terminating system index associated with the fourth prepaid subscription account to indicate the fourth prepaid subscription account is a postpaid account.

12. The method of claim 11, wherein the first account status is associated with prepaid subscription accounts performing as agreed with terms of associated prepaid subscription agreements, and wherein the second account status is associated with prepaid subscription accounts not performing as agreed with terms of associated prepaid subscription agreements.

13. The method of claim 11, wherein a portable electronic device associated with a prepaid subscription account with a mobile terminating system index that indicates the prepaid subscription account is a postpaid account receives voice calls without engagement of a rating engine.

14. The method of claim 11, wherein the account status of the fourth prepaid subscription account changes from the second status to the first status upon receipt of payment, and wherein the payment causes the fourth prepaid subscription account to become compliant with terms of a fourth prepaid subscription agreement.

* * * * *